March 19, 1957     F. L. MURDOCK, SR     2,785,766
GAS, OIL AND WATER SEPARATOR
Filed Aug. 8, 1955     3 Sheets-Sheet 1
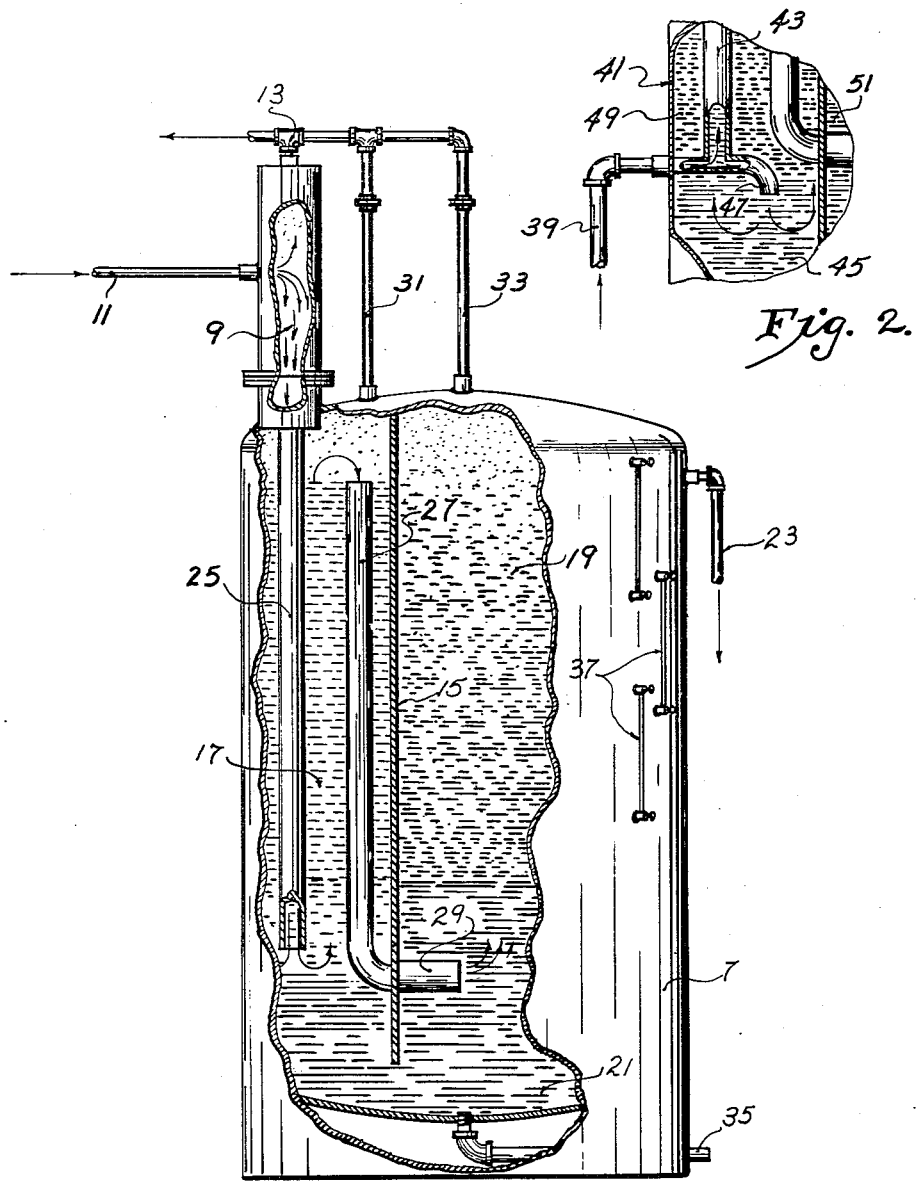
Fig. 2.
Fig. 1.
INVENTOR.
Forrest L. Murdock, Sr.
BY
ATTORNEY March 19, 1957     F. L. MURDOCK, SR     2,785,766
GAS, OIL AND WATER SEPARATOR
Filed Aug. 8, 1955     3 Sheets-Sheet 2
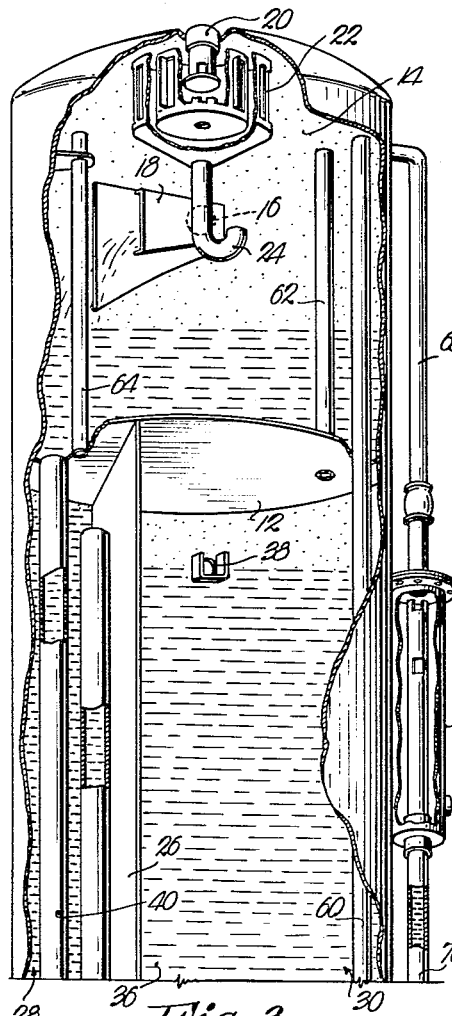
Fig. 3.
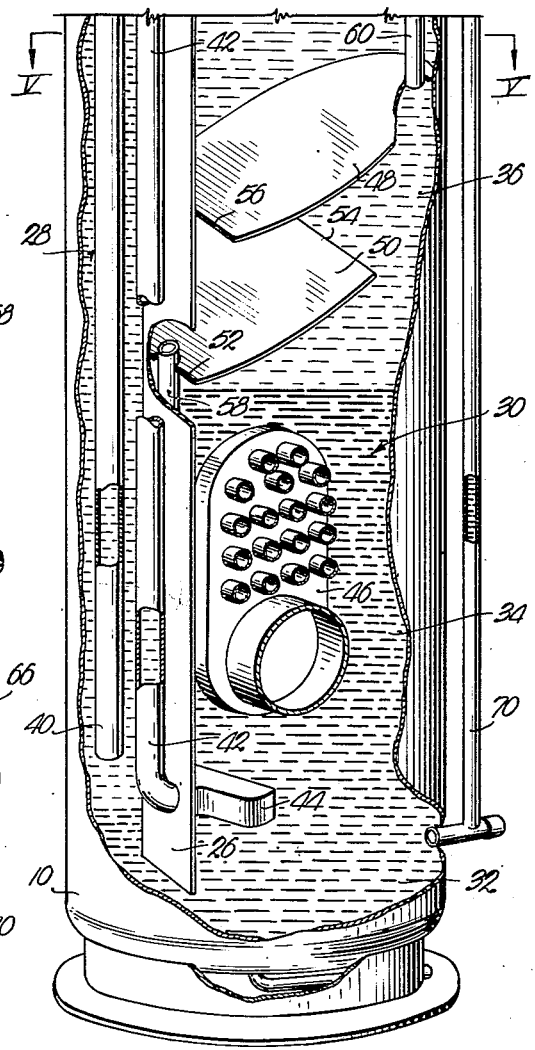
Fig. 4.
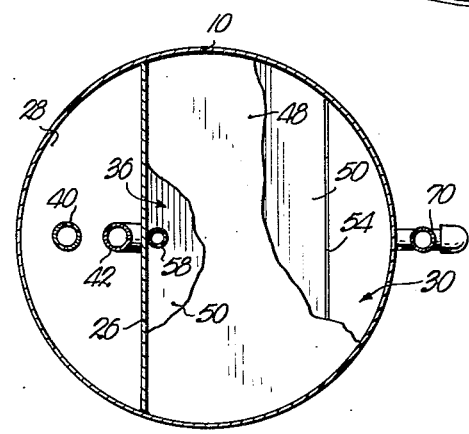
Fig. 5.
INVENTOR.
Forrest L. Murdock, Sr.
BY 
ATTORNEY.

March 19, 1957  F. L. MURDOCK, SR  2,785,766
GAS, OIL AND WATER SEPARATOR
Filed Aug. 8, 1955  3 Sheets-Sheet 3

INVENTOR.
Forrest L. Murdock, Sr.
BY
ATTORNEY

United States Patent Office 2,785,766
Patented Mar. 19, 1957

2,785,766

GAS, OIL, AND WATER SEPARATOR

Forrest L. Murdock, Sr., Tulsa, Okla.

Application August 8, 1955, Serial No. 527,012

7 Claims. (Cl. 183—2.7)

This invention relates to improvements in emulsion treaters capable of handling large volumes of oil, water and gas, and to separate the same quickly and economically at relatively low operating costs whereby to produce higher gravity pipe line oil.

It is the primary object of the instant invention to provide a treater that operates on the principle of permitting the oil, water and gas to seek their own levels without appreciable disturbance or rolling so that the gas and water will readily separate from the oil, and predicated upon the additional principle of quickly removing all free water and gas and thereupon causing the emulsion to rise gradually and slowly within the settling compartment, all the while removing water and gas to further reduce such disturbance and rolling of the emulsion.

Another object of this invention is to provide a treater that includes a water collection area at the bottom of the shell, common to the said chamber and compartment permitting the use of a single water siphon.

It is an important object of the instant invention to provide a separator that incorporates a novel pre-heat chamber eliminating the necessity of heat exchangers and free water knockouts, and producing a slow constant rise in temperature in the emulsion whereby a maximum amount of free water and free gas are released, thereby increasing the life of the heating means, effecting savings in fuel costs and eliminating the handling of large volumes of oil and water.

Another important object of the instant invention is to provide an emulsion treater incorporating the aforesaid pre-heat compartment wherein is provided an emulsion delivery conduit, together with a downcomer for directing the emulsion to the pre-heat chamber to assure maximum removal of free water as an initial step in the separating method so that only a relatively small amount of emulsion actually needs to be washed over the furnace and through the hot water in the wash area of the treater.

A further object of this invention is to provide an emulsion treater permitting disposition of the settling area above the heating compartment by utilization of novel baffling means capable of reducing turbulent movement which would otherwise tend to hold the water in suspension within the emulsion and lower the gravity of the pipe line oil.

A still further object of this invention is to provide an emulsion treater for gradually and progressively raising the temperature of the emulsion so as to lower its viscosity and accelerate the separation of oil, gas and water through utilization of a recirculating system that carries the hot water from the wash area through the combination pre-heat and free water knockout chamber and thence back to said wash area. In the accompanying drawings:

Figure 1 is an elevational view of a gas, oil and water separator made pursuant to one form of my invention, parts being broken away and in section to reveal details of construction.

Figure 2 is a fragmentary view, broken away and in section showing a modified form of the invention.

Figure 3 is an elevational view of the uppermost portion of a gas, oil and water separator made pursuant to another form of my invention, parts being broken away for clearness.

Figure 4 is a view similar to Figure 3 showing the lower portion of the said separator.

Figure 5 is a cross-sectional view taken on line III—III of Figure 4, parts being broken away for clearness.

Figure 6:
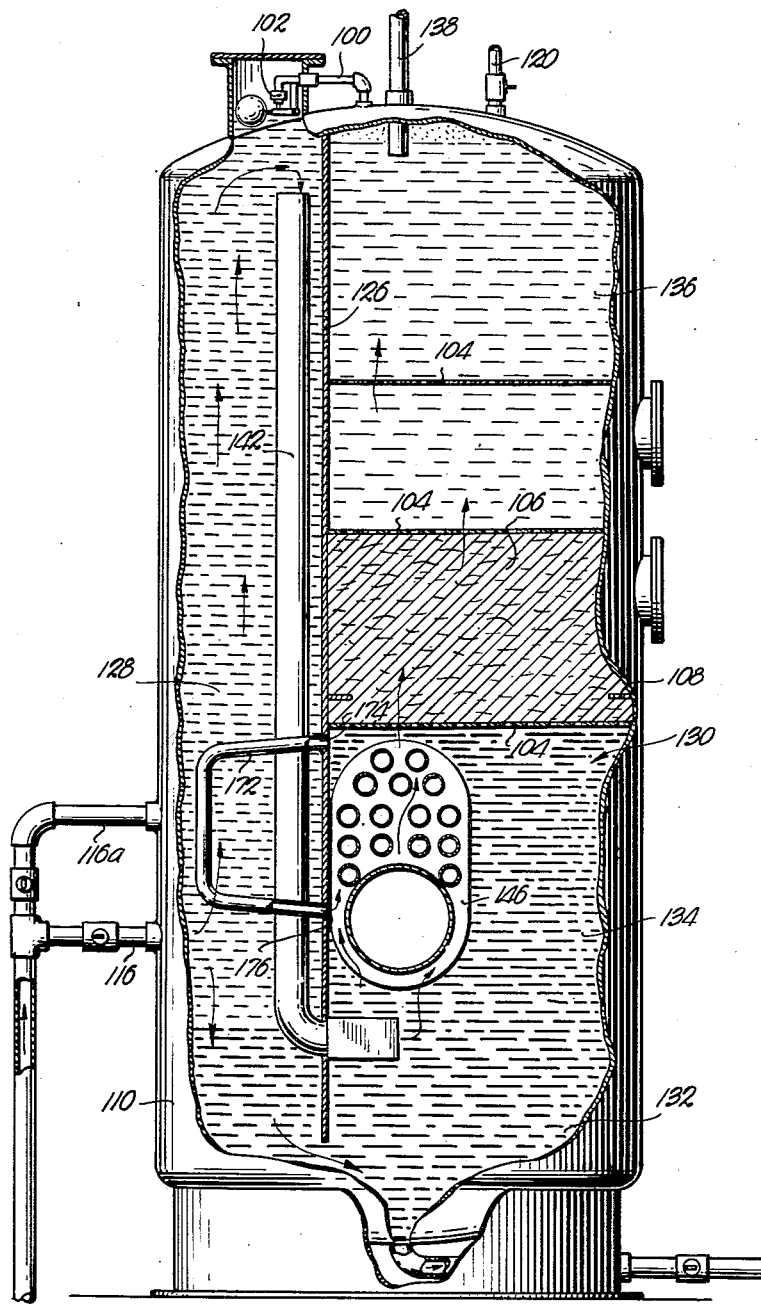
Figure 6 is an elevational view of another form of the invention, parts being broken away and in section to reveal details of construction.

The baffle type, flow and receiving tank illustrated in Figure 1 of the drawings embodies a hollow, upright shell 7 having a gas separation drum or chamber 9 at the uppermost end thereof into which emulsion is introduced by way of inlet 11. Free gas separating from the incoming emulsion is discharged from chamber 9 by way of outlet 13.

A vertical baffle 15 depending from the upper end of shell 7 and terminating above the lowermost end thereof subdivides shell 7 into a free water knockout chamber 17 and a quiet settling compartment 19. Water collection area 21 at the bottom of shell 7 is common to the chamber 17 and the compartment 19. An oil outlet 23 in shell 7 communicates with compartment 19.

Emulsion flows from chamber 9 by gravity, through a delivery pipe 25 within the chamber 17, terminating near the lowermost end of baffle 15 to deliver the emulsion to area 21. A downcomer 27, also within chamber 17, has its uppermost end terminating below the top of tank 7 and its lowermost end extending through the partition 15 near the lowermost end of the latter, terminating in a spreader box 29.

Pressure equalizer pipes 31 and 33 place gas outlet 13 into communication with chamber 17 and compartment 19 respectively. A conventional water siphon system may be coupled with water outlet 35 if desired, but flow of water from area 21 may be regulated after checking the water level through use of gage glasses 37.

In operation, free gas is immediately removed from the incoming emulsion, thereby reducing the turbulence and causing a substantial amount of free water to be initially dumped into area 21 at the lowermost end of pipe 25. Such quieting action renders more effective the settling out of additional water in the chamber 17, and here again gas is removed via pipe 31. By the time the emulsion is delivered into compartment 19, it has quieted down to such extent that a substantial amount of the remaining water settles out before overflow of the rising oil into outlet 23. A maintained pressure, and therefore regulated liquid level in chamber 17 and compartment 19 may be effected if desired by a pressure regulator (not shown) in outlet 13.

The embodiment shown in Figure 2 is substantially the same as that just above described except that inlet 11 is removed from drum 9 and connected as at 39 to shell 41 at the lowermost end of pipe 43 with which inlet 39 communicates.

Since the emulsion is fed directly into water area 45 by virtue of downspout 47, there is very little disturbance of the gas contained therein and both chamber 49 and compartment 51 become quiet settling areas. In furtherance of such prevention of turbulence in order to effect a large percentage of water separation, the free gas is permitted to rise immediately through the emulsion in pipe 43 and escape from drum 9 via outlet 13.

The emulsion treater or oil, water and gas separator illustrated in Figures 3 to 5 inclusive, embodies a hollow, upright shell or tank 10, having a horizontal partition 12 presenting a space or chamber 14 thereabove into which the emulsion to be treated is initially introduced by way of inlet 16 in the shell 10. As the emulsion flows past diverter box 18 free gas is immediately separated therefrom because of the swirling centrifugal motion imparted thereto. Before being discharged from the shell 10 by way of outlet 20, the gas is scrubbed in mist extractor 22 and the oil and gasoline removed thereby returns to the space 14 by way of pipe 24.

A vertical, pre-heat baffle 26 depending from the partition 12 and terminating above the lowermost end of the shell 10, subdivides that part of the shell 10 below partition 12 into a combination from water knockout and pre-heating chamber 28 on one side of the baffle 26 and a heater compartment 30 on the opposite side of the baffle 26. Water collection area 32 at the said bottom of shell 10, is common to the chamber 28 and the compartment 30.

The compartment 30 is further sub-divided into a hot water wash area 34 and a settling area 36. Shell 10 is provided with an oil outlet 38 just below the partition 12 and communicating with the settling area 36.

Emulsion flows from the space 14 by gravity, through a delivery pipe 40 within the chamber 28 which has an uppermost end extending through the partition 12 and communicating with the space 14. The lowermost end of the pipe 40 terminates near the lower end of the baffle 26 and, therefore, delivers the emulsion to the area 32.

A downcomer 42 also within the chamber 28, has its uppermost end opening just below the partition 12 and its lowermost end extending through the baffle 26 near the lower end of the latter, terminating in a spreader box 44.

The wash area 34 of heating compartment 30, is provided with a furnace 46 above the spreader box 44, and a pair of inclined baffles 48 and 50 are mounted within the settling area 36 above the furnace 46. Baffle 50 is circular and joined to the cylindrical surface of shell 10 except along lowermost chord edge 52 which is joined to baffle 26 and chord edge 54 produced by cutting away the baffle 50 to permit upward flow of the emulsion from the wash area 34. Baffle 48 is also substantially circular and joined to shell 10 except for the fact that it is cut away in opposed relationship to the baffle 50 to present a chord edge 56 in spaced parallelism to the baffle 26.

A pipe 58 depending from the baffle 50 at the lowermost edge 52 thereof, conveys water to the wash area 34 and a pipe 60 extending through and rising from the baffle 48 at the uppermost extremities thereof, extends through the partition 12 and terminates above the level of emulsion in space 14. Pipe 60, as well as pipe 62, discharges gas into the space 14, pipe 62 extending through the partition 12 and communicating with the settling area 36 above the level of emulsion in the latter which is normally adjacent the outlet opening 38. The chamber 28 is likewise equalized through the medium of a pipe 64, and a water siphon 66 is equalized by means of a pipe 68, pipes 64 and 68 both communicating with the space 14. Siphon 66 communicates with the collection area 32 by means of a pipe 70.

In operation, the emulsion which contains gas, water and oil, is directed into the space 14 of shell 10 above partition 12 by way of inlet 16. Free gas arises immediately and maintains the pressure in all parts of the treater equal with the space 14 by virtue of the pipes 64, 62, 60 and 68, which pressure may be predetermined by provision of a suitable regulator (not shown) within the outlet 20.

Liquids removed by the extractor 22 are redirected to the chamber 14 by means of pipe 24. The emulsion flows from the space 14 to the chamber 28 by way of the pipe 40 which discharges such emulsion to the water collection area 32 as seen in Figure 2. Manifestly, the heat that is produced by the furnace 46 in the compartment 36 is transferred through the baffle 26 to the chamber 28 and, therefore, the downwardly moving emulsion in the pipe 40 is pre-heated prior to discharge into the collection area 32. Thus, a substantial amount of the free water is immediately removed and discharged before the emulsion commences its upward movement within the chamber 28. Such upwardly traveling emulsion is again heated and more water settles out within the chamber 28 prior to the overflow of the emulsion into the uppermost open end of the downcomer 42.

Here, again, as the emulsion descends in the downcomer 42, it is still further heated and to a great extent, by virtue of the close proximity of the downcomer 42, to the hot heat exchange baffle plate 26. Accordingly, additional water will separate from the emulsion as the latter emanates from spreader box 44. The emulsion rises by natural flow through the water in wash area 34 and its temperature is still further raised as it impinges upon the furnace 46. By virtue of such rise in temperature in the emulsion, it flows rapidly into the settling area 36, but such movement is retarded by the baffles 48 and 50. The emulsion must travel a circuitous path around the edges 54 and 56 of the baffles 50 and 48 respectively, and in order to still further reduce the rather violent disturbance that is taking place in the emulsion, the gas which collects beneath the baffle 48 and adjacent its uppermost extremities, is collected and discharged into the space 14 by way of pipe 60.

In the settling area 36 more water and gas is removed, the water settling to the baffle 50 and being re-directed into the wash area 34 by way of pipe 58. The gas in settling compartment 36 is discharged into, or equalized with, the gas in space 14 by virtue of the provision of pipe 62. Clean oil substantially free of gas and water, is drained from the shell 10 by means of outlet 38.

The details of construction of the siphoning means 66 forms no part of the present invention but, as is conventional, the same is adjustable so as to drain the water from the area 32 at a desired rate, depending upon the maintained pressure within the treater and, therefore, within the pipe 68 and depending upon the ratio of gas, water and oil in the emulsion which enters the treater initially as the inlet 16.

In the embodiment of my invention illustrated in Figure 6 of the drawings, there is provided a treater having an improved means for raising the temperature of the pre-heating chamber by means of a continuous recirculation of water from the wash area.

Shell 110 has a vertical heat transfer baffle 126 closed at the uppermost end thereof by joinder with the top of the shell 110, but spaced from the lowermost end of the latter in the same manner as baffle 26 to present a water collection area 132. A pre-heat chamber 128 on one side of the baffle 126 receives a downcomer 142 that communicates with compartment 130 and particularly, wash area 134 of the latter.

A primary emulsion inlet 116 and an auxiliary emulsion inlet 116a, are valve controlled and communicate with the chamber 128. Gas flow from the chamber 128 to the compartment 130 by way of a connecting pipe 100 is regulated by a flow control valve 102 that is responsive to the level of emulsion within the compartment 128. Gas outlet 120 communicating with the compartment 130 above the level of clean oil in the latter, may be provided with a suitable safety relief valve to maintain a predetermined pressure for operation of the treater.

Baffling within settling area 136 of compartment 130 includes a series of perforated, horizontal partitions 104 adapted to receive filtering material 106 shown between but two of the partitions 104 in the drawings. A peripheral ring or flange 108 in the compartment 130, tends to prevent channeling of the upwardly moving emulsion along the side walls of the compartment 130. Clean oil flows from the treater by way of outlet 138 and suitable means for siphoning the water from area 132 (not shown) may be provided if desired.

In order to more effectively transfer the heat of compartment 30 to the chamber 128 and thereby raise the temperature of the emulsion as it rises in chamber 28 and then descends through downcomer 142, there is provided a series of recirculating pipes 172 in the chamber 128 which may be U-shaped as illustrated. The pipes 172 have inlets 174 communicating with the wash area 134 adjacent the uppermost extremities of the latter and outlets 176 likewise extending through the baffle 126 at a point below the inlets 174. By way of example, the inlets 174 may be arranged adjacent the upper end of furnace 146 and the outlets 176 may be disposed to redirect the water into the compartment 130 for flow directly to the furnace 146.

Natural flow of water in the coils 172, tends to heat the emulsion in chamber 128, thereby effecting the desired purpose of the instant invention, namely, that of gradual and progressive elevation of the temperature of the emulsion until it flows into the settling section above the furnace.

Having thus described the invention what is claimed as new and desired to be secured by Letters Patent is:

1. In an emulsion treater, a hollow shell; a horizontal partition in the shell, presenting a chamber thereabove, said shell having an emulsion inlet communicating with the chamber; a vertical panel abutting the lowermost face of the partition and depending therefrom, said panel traversing the shell therewithin and being spaced from the bottom thereof, presenting a pair of compartments one on each side respectively of the panel below the partition, said shell having an oil outlet communicating with one of said compartments adjacent the partition; a vertical pipe depending from the partition in the other of said compartments and terminating near the bottom of the latter, said pipe communicating with the chamber through the partition for delivering emulsion from the chamber to said other compartment; and a vertical downcomer in said other compartment having an uppermost open end adjacent the partition and extending through the panel adjacent the lowermost end of the latter for delivering emulsion from said other compartment to said one compartment.

2. In an emulsion treater as set forth in claim 1 wherein is provided a pair of vertically spaced baffles in said one compartment intermediate the uppermost and lowermost ends of the latter, said baffles being attached to the shell and being inclined downwardly and inwardly toward the panel, one of said baffles having its lowermost edge abutting the panel and its uppermost edge spaced from the shell, the other of said baffles having its lowermost edge spaced from the panel and its uppermost edge abutting the shell, forcing oil, rising in the one compartment, to follow a serpentine path of travel.

3. In an emulsion treater as set forth in claim 2 wherein is provided a furnace in said one compartment below the baffles, said downcomer discharging through the panel into the one compartment below the furnace.

4. In an emulsion treater as set forth in claim 1 wherein is provided a pair of vertically spaced baffles in said one compartment intermediate the uppermost and lowermost ends of the latter, said baffles being attached to the shell and being inclined downwardly and inwardly toward the panel, the lowermost of said baffles having its lowermost edge abutting the panel and its uppermost edge spaced from the shell, the uppermost of said baffles having its lowermost edge spaced from the panel and its uppermost edge abutting the shell, forcing oil, rising in one compartment, to follow a serpentine path of travel.

5. In an emulsion treater as set forth in claim 4 wherein is provided a vertical conduit in said one compartment, depending from the lowermost baffle adjacent said lowermost edge of the latter, and extending through the lowermost baffle for delivering water from between the baffles toward said bottom of the shell.

6. In an emulsion treater as set forth in claim 4 wherein is provided a vertical tube in said one compartment, extending through the uppermost baffle adjacent the uppermost edge of the latter, and through the partition into the chamber for discharging gas to the latter.

7. In an emulsion treater as set forth in claim 6 wherein is provided a vertical conduit in said one compartment, depending from the lowermost baffle adjacent said lowermost edge of the latter, and extending through the lowermost baffle for delivering water from between the baffles toward said bottom of the shell.

References Cited in the file of this patent

UNITED STATES PATENTS

| | | |
|---|---|---|
| 2,342,950 | Lovelady et al. | Feb. 29, 1944 |
| 2,528,032 | Candler et al. | Oct. 31, 1950 |
| 2,614,649 | Walker et al. | Oct. 21, 1952 |
| 2,615,528 | Williams | Oct. 28, 1952 |
| 2,620,043 | Williams | Dec. 2, 1952 |
| 2,664,963 | Lovelady et al. | Jan. 5, 1954 |
| 2,713,919 | Walker et al. | July 26, 1955 |